United States Patent
Ishihara et al.

(10) Patent No.: US 9,133,048 B2
(45) Date of Patent: Sep. 15, 2015

(54) SEAWATER DESALINATION METHOD

(75) Inventors: Satoru Ishihara, Osaka (JP); Hiroshi Iwahori, Osaka (JP); Yuuji Yamashiro, Osaka (JP)

(73) Assignee: Nitto Denko Corporation, Osaka (JP)

(*) Notice: Subject to any disclaimer, the term of this patent is extended or adjusted under 35 U.S.C. 154(b) by 68 days.

(21) Appl. No.: 14/240,984

(22) PCT Filed: Aug. 31, 2012

(86) PCT No.: PCT/JP2012/005512
§ 371 (c)(1),
(2), (4) Date: Feb. 25, 2014

(87) PCT Pub. No.: WO2013/031231
PCT Pub. Date: Mar. 7, 2013

(65) Prior Publication Data
US 2014/0231344 A1    Aug. 21, 2014

(30) Foreign Application Priority Data
Sep. 2, 2011   (JP) .................. 2011-192135

(51) Int. Cl.
| | |
|---|---|
| B01D 61/14 | (2006.01) |
| C02F 9/00 | (2006.01) |
| B01D 61/58 | (2006.01) |
| C02F 1/32 | (2006.01) |
| C02F 1/44 | (2006.01) |
| C02F 103/08 | (2006.01) |
| C02F 3/12 | (2006.01) |
| B01D 61/02 | (2006.01) |

(52) U.S. Cl.
CPC . *C02F 9/00* (2013.01); *B01D 61/58* (2013.01); *C02F 3/1268* (2013.01); *B01D 61/025* (2013.01); *B01D 61/145* (2013.01); *B01D 2311/2619* (2013.01); *C02F 1/32* (2013.01); *C02F 1/441* (2013.01); *C02F 1/444* (2013.01); *C02F 3/1273* (2013.01); *C02F 2103/08* (2013.01); *C02F 2209/11* (2013.01); *C02F 2303/04* (2013.01); *C02F 2303/20* (2013.01); *Y02W 10/15* (2015.05)

(58) Field of Classification Search
None
See application file for complete search history.

(56) References Cited

U.S. PATENT DOCUMENTS

| | | | |
|---|---|---|---|
| 8,070,953 B2 | 12/2011 | Ito et al. | |
| 8,696,908 B2 * | 4/2014 | MacLaggan | 210/631 |

(Continued)

FOREIGN PATENT DOCUMENTS

| | | |
|---|---|---|
| JP | 2007-069204 | 3/2007 |
| JP | 4481345 | 6/2010 |
| WO | 2006/057249 | 6/2006 |

(Continued)

*Primary Examiner* — Chester Barry
(74) *Attorney, Agent, or Firm* — Hamre, Schumann, Mueller & Larson, P.C.

(57) ABSTRACT

A seawater desalination method of the present invention includes the steps of: obtaining ultrafiltration membrane-treated water by subjecting seawater (2) to an ultrafiltration membrane treatment; obtaining membrane bioreactor-treated water by subjecting organic wastewater (1) to a membrane bioreactor treatment; obtaining mixed water by mixing the ultrafiltration membrane-treated water and the membrane bioreactor-treated water; obtaining ultraviolet irradiation-treated water by subjecting the mixed water to an ultraviolet irradiation treatment; and subjecting the ultraviolet irradiation-treated water to a reverse osmosis membrane treatment.

4 Claims, 1 Drawing Sheet

(56) References Cited

U.S. PATENT DOCUMENTS

2012/0255907 A1 10/2012 Ogiwara et al.
2014/0048462 A1* 2/2014 Cohen et al. ................ 210/96.2

FOREIGN PATENT DOCUMENTS

| WO | 2010/061879 | 6/2010 |
| WO | 2011/077815 | 6/2011 |

* cited by examiner

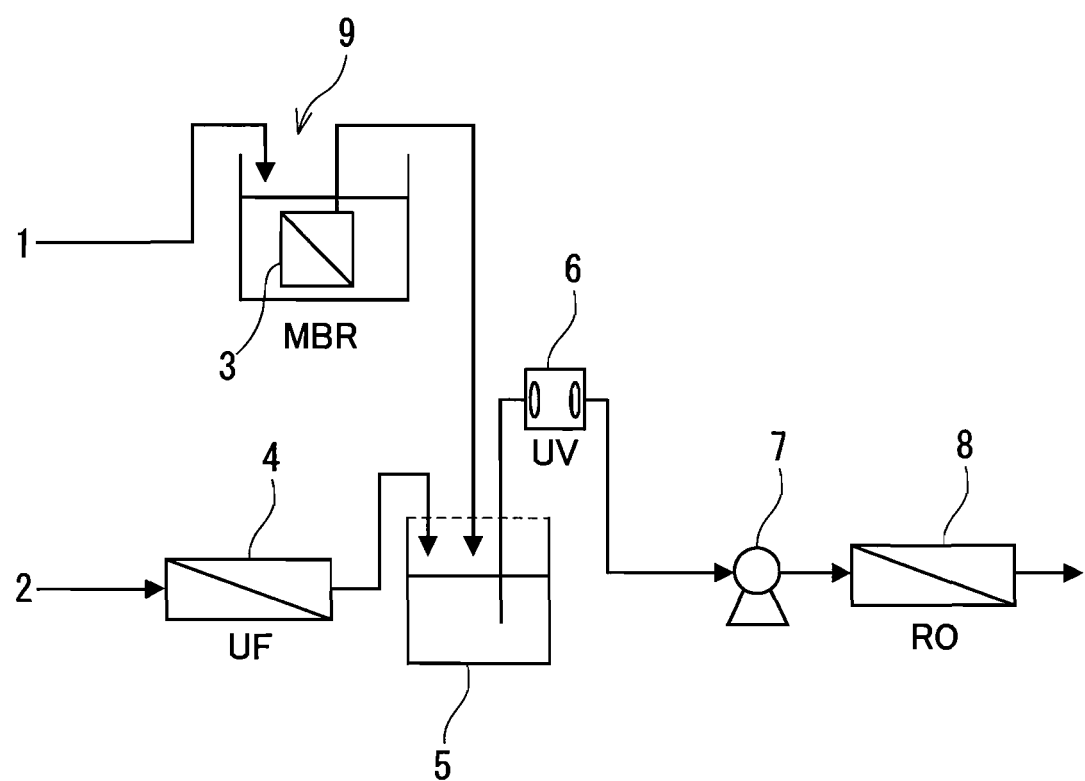

SEAWATER DESALINATION METHOD

TECHNICAL FIELD

The present invention relates to a seawater desalination method including pretreating seawater and then converting the seawater into freshwater using a reverse osmosis membrane.

BACKGROUND ART

In recent years, there has been a demand for conversion of seawater into freshwater by desalination in large coastal cities in arid or semi-arid regions where it is difficult to constantly secure water resources. For the seawater desalination, evaporation techniques implemented in large-scale plants in high-temperature regions, and membrane techniques using a reverse osmosis membrane for desalination, have been commercialized. In recent years, seawater desalination using membrane techniques has been drawing attention by virtue of its high desalination efficiency and the like.

For such seawater desalination by membrane techniques, the following methods have been proposed: a method aimed at preventing treatment efficiency from decreasing due to entrance of contaminants such as polymers into a reverse osmosis membrane, the method consisting of treating seawater with an ultrafiltration membrane or a low-pressure reverse osmosis membrane, and then desalting the seawater using a reverse osmosis membrane; and a method aimed at improving energy efficiency by decreasing the salt concentration of seawater entering a reverse osmosis membrane, the method consisting of mixing seawater with river water or membrane bioreactor-treated water, and then desalting the seawater using a reverse osmosis membrane (see Patent Literature 1, for example). However, with these conventional methods, it is not possible to suppress occurrence of biofouling which is caused, for example, on the surface of a reverse osmosis membrane by microorganisms and the like. Accordingly, there is observed a tendency that the permeation performance or the separation performance of the reverse osmosis membrane is significantly deteriorated as a result of the reverse osmosis membrane being used continuously for long years. Meanwhile, in water treatments including but not limited to seawater desalination, approaches to suppress biofouling by addition of bactericides or by an ultraviolet irradiation treatment have also been made (see Patent Literature 2, for example). However, it has been found that in the case of the methods mentioned above, the effect of an ultraviolet irradiation treatment is not sufficiently obtained because of high turbidity of the water to be treated, and the activity of microorganisms is consequently restored in the reverse osmosis membrane treatment.

CITATION LIST

Patent Literature

Patent Literature 1: JP 4481345 B
Patent Literature 2: JP 2007-069204 A

SUMMARY OF INVENTION

Technical Problem

The present invention aims to provide a seawater desalination method for a seawater desalination treatment using a reverse osmosis membrane. The method is highly effective in suppressing biofouling, and is capable of being used continuously for a long period of time.

Solution to Problem

The present invention provides a seawater desalination method for obtaining freshwater from seawater by a reverse osmosis membrane treatment, the method including the steps of: obtaining ultrafiltration membrane-treated water by subjecting seawater to an ultrafiltration membrane treatment; obtaining membrane bioreactor-treated water by subjecting organic wastewater to a membrane bioreactor treatment; obtaining mixed water by mixing the ultrafiltration membrane-treated water and the membrane bioreactor-treated water; obtaining ultraviolet irradiation-treated water by subjecting the mixed water to an ultraviolet irradiation treatment; and subjecting the ultraviolet irradiation-treated water to a reverse osmosis membrane treatment.

Advantageous Effects of Invention

According to the present invention, treated water resulting from a membrane bioreactor treatment of sewage water or the like can be mixed with seawater subjected to an ultrafiltration membrane treatment so as to decrease the osmotic pressure of the mixed water. Therefore, a given amount of freshwater can be produced with reduced energy consumption by lowering the operation pressure during the reverse osmosis membrane treatment. In this invention, an ultraviolet irradiation treatment is employed in order to suppress biofouling caused by microorganisms and the like that increase in number in a reverse osmosis membrane module or a mixing tank in association with the use of membrane bioreactor-treated water. If the membrane bioreactor-treated water and seawater were directly mixed, the turbidity of the mixed water would be increased, and the efficiency of the ultraviolet treatment would be significantly degraded. However, since water having permeated through an ultrafiltration membrane is mixed in, the turbidity of the mixed water is decreased, and the efficiency of the ultraviolet irradiation is enhanced, with the result that the consumed energy can be kept low and biofouling can be considerably mitigated. Therefore, the present invention has no need to use a chlorine-based bactericide such as chloramine or SBS, and thus can reduce deterioration of the reverse osmosis membrane and avoid accumulation of a by-product such as trihalomethane generated in another bacterial killing treatment, thereby enabling seawater desalination that is stable over a long period of time.

BRIEF DESCRIPTION OF DRAWING

FIG. 1 is a schematic diagram showing an example of a seawater desalination method of the present invention.

DESCRIPTION OF EMBODIMENTS

According to the present invention, the seawater desalination treatment using a reverse osmosis membrane includes, as shown in FIG. 1, the steps of obtaining ultrafiltration membrane-treated water by treating seawater 2 in an ultrafiltration membrane module 4; and obtaining membrane bioreactor-treated water by treating organic wastewater 1 via a membrane bioreactor treatment apparatus 9. The ultrafiltration membrane-treated water and the membrane bioreactor-treated water obtained by the treatments are mixed together in a mixed water tank 5 to obtain a mixed water, and then the mixed water is treated using an ultraviolet irradiation treatment apparatus 6 to obtain ultraviolet irradiation-treated water. The ultraviolet irradiation-treated water is supplied to a reverse osmosis membrane module 8, and freshwater can thereby be obtained.

For the treatment of the seawater 2 by the ultrafiltration membrane module 4, the ultrafiltration membrane used may be a conventionally-known ultrafiltration membrane such as a polysulfone-based, polyacrylonitrile-based, cellulose acetate-based, polyamide-based, polycarbonate-based, or polyvinyl alcohol-based ultrafiltration membrane, and is not particularly limited. Also, the membrane used can be in the form of any of a hollow fiber-type membrane (capillary membrane, hollow fiber membrane, etc.), a flat membrane, and a tubular membrane. The membrane is integrated into the module. The average pore diameter of the ultrafiltration membrane is preferably about 1 to 100 nm.

In the treatment of the organic wastewater 1 in the membrane bioreactor treatment apparatus 9, the organic wastewater 1 to be treated may be sewage water or domestic wastewater, and is not particularly limited as long as it can ordinarily be biologically treated in the membrane bioreactor treatment apparatus. A filtration membrane 3 used in the membrane bioreactor treatment is preferably in the form of, for example, a flat membrane element structure in which filtration membranes are attached to both faces of a frame with filtration water flow path materials interposed between the membranes and the faces of the frame, in order to improve the handleability and physical durability of the filtration membrane 3. The structure of the filtration membrane 3 is not particularly limited. A microfiltration membrane, an ultrafiltration membrane, or the like, can be used. An element using a hollow fiber-type membrane may also be used. However, the flat membrane element structure is preferably used due to its high effectiveness in removal of contaminants. The concept of the flat membrane element structure includes a rotary flat membrane structure.

Examples of the membrane structure of the filtration membrane 3 include, but not particularly limited to, porous membranes and composite membranes in which a porous membrane is combined with a functional layer. Specific examples of the membranes include porous membranes such as porous polyacrylonitrile membranes, porous polyimide membranes, porous polyethersulfone membranes, porous polyphenylene sulfide sulfone membranes, porous polytetrafluoroethylene membranes, porous polyvinylidene fluoride membranes, porous polypropylene membranes, and porous polyethylene membranes. Porous polyvinylidene fluoride membranes and porous polytetrafluoroethylene membranes have high chemical resistance, and thus are particularly preferred. Further examples include composite membranes in which any one of the above-mentioned porous membranes is combined with a functional layer made of a rubbery polymer such as crosslinked silicone, polybutadiene, polyacrylonitrile butadiene, ethylene propylene rubber, or neoprene rubber.

The water treatment tank of the membrane bioreactor treatment apparatus 9 is not particularly limited as long as the water to be treated can be retained, and the filtration membrane 3 can be submerged in the water to be treated. A concrete tank, a fiber-reinforced plastic tank, or the like, is preferably used. In addition, the inside of the water treatment tank may be divided into a plurality of sections. Furthermore, a membrane bioreactor treatment apparatus may be formed by installing a vertical casing-type membrane element outside an activated sludge tank together with piping for a pressure circulation pump.

Activated sludge introduced into the water treatment tank is one commonly used in wastewater treatments etc. Removed sludge in another wastewater treatment facility is usually used as seed sludge. The membrane bioreactor process is operated at a sludge concentration of about 2,000 mg/L to 20,000 mg/L. Activated sludge treatment is a treatment in which water clarification can be achieved by microorganisms utilizing pollutants in organic wastewater as nutrients.

The mixed water tank 5 is not particularly limited as long as filtered water from the filtration membrane 3 for membrane bioreactor treatment and permeate water obtained through the ultrafiltration membrane module 4 can be retained. A concrete tank, a fiber-reinforced plastic tank, or the like, is preferably used. In order to filter the water to be treated using the filtration membrane 3, a pump or the like may be provided between the filtration membrane 3 and the mixed water tank 5. In addition, in order to produce a hydraulic head difference, the liquid level in the mixed water tank 5 is preferably lower than the level of the water to be treated in the membrane bioreactor treatment apparatus 9.

The ultrafiltration membrane-treated water and the membrane bioreactor-treated water are mixed together in the mixed water tank 5. The mixing ratio is not particularly limited. The ratio, ultrafiltration membrane-treated water:membrane bioreactor-treated water, is preferably about 4:6 to 9:1 and more preferably 5:5 to 6:4 on a weight basis. In the mixed water tank, stirring is preferably performed as appropriate. In the present invention, the turbidity in the mixed water tank 5 is made low, which increases the efficiency of the subsequent ultraviolet irradiation treatment. The turbidity is preferably 0.001 to 0.5 NTU (Nephelometric Turbidity Unit), more preferably 0.2 NTU or less, and even more preferably 0.1 NTU or less. Such turbidity can be achieved by adjusting the mixing ratio of the ultrafiltration membrane-treated water.

The mixed water is subjected to an ultraviolet irradiation treatment in the ultraviolet irradiation treatment apparatus 6. The ultraviolet irradiation treatment apparatus 6 is aimed at killing microorganisms and decomposing soluble organic substances in the mixed water. The types of the ultraviolet irradiation treatment apparatus 6 include an irradiation-type apparatus for directly irradiating the water surface with ultraviolet light, a submerged-type apparatus including a lamp used by being submerged in the water, a flowing water external irradiation-type apparatus for externally irradiating the flowing water, and a flowing water internal irradiation-type apparatus for internally irradiating the flowing water. Any of these apparatuses can be selected and used as appropriate. Ultraviolet light having wavelengths ranging from 250 to 260 nm has proven to provide a strong bacterial killing effect. Irradiation with ultraviolet light having a wavelength of about 185 nm is effective, particularly for organic substances.

Examples of the ultraviolet irradiation treatment apparatus 6 of the present invention may include, but not limited to, an apparatus using a low-pressure mercury lamp capable of emitting ultraviolet light having a wavelength of around 185 nm and ultraviolet light having a wavelength of around 254 nm. The amount of ultraviolet light required for bacterial killing varies depending on the type of the targeted microorganisms. The amount of ultraviolet light is preferably 10 mJ/cm$^2$ or more and 140 mJ/cm$^2$ or less. If so, a large proportion of the bacteria can be killed.

The ultraviolet irradiation-treated water is supplied to the reverse osmosis membrane module 8 via a booster pump 7, and is converted into freshwater. The booster pump 7 is not particularly limited, and examples thereof may include a volute pump, a diffuser pump, a volute type mixed-flow pump, a mixed flow pump, a piston pump, a plunger pump, a diaphragm pump, a gear pump, a screw pump, a vane pump, a cascade pump, and a jet pump. The pressure required depends on the osmotic pressure of the water to be treated and the performance of the reverse osmosis membrane module 8, and is about 1 to 10 MPa.

For example, the reverse osmosis membrane module 8 used is one obtained by using a composite reverse osmosis membrane together with other members such as a spacer and a central tube to form a spiral element, and loading one or more such spiral elements into a pressure container, the composite reverse osmosis membrane including a non-woven fabric, a porous support formed by polysulfone or the like on the non-woven fabric, and a semipermeable polyamide skin layer formed on the porous support.

Pipes made of resin or metal can be used as the pipes for connecting the apparatuses and modules together. In order to enhance the effect of the present invention, a configuration that can minimize the number of recesses and projections in which microorganisms etc. tend to accumulate and that can minimize contact with outside light and outside air is preferably employed so that increase in the number of microorganisms etc. can be suppressed. Especially for the stages subsequent to the ultraviolet irradiation treatment, it is particularly preferable to shorten the distance to the reverse osmosis membrane apparatus as much as possible, and to design the apparatus configuration as described above which can suppress increase in the number of microorganisms etc.

It is also particularly preferable to dispose the ultraviolet irradiation treatment apparatus 6 between the booster pump 7 and the reverse osmosis membrane module 8. By so doing, the ultraviolet irradiation-treated water can be supplied directly to the reverse osmosis membrane module 8 without passing through any other apparatus, and thus the biofouling suppressing effect in the reverse osmosis membrane module 8 is more significantly enhanced. In this case, the flow path for the water to be treated in the ultraviolet irradiation treatment apparatus 6 is required to have a sealed, pressure-resistant structure, and thus is preferably formed of an ultraviolet-transmitting transparent resin or glass.

EXAMPLES

The present invention will be described in more detail with reference to examples. The present invention is not limited to the examples given below.

Example 1

In the seawater desalination system shown in FIG. 1, MBR-treated water was prepared by subjecting domestic wastewater as the organic wastewater to a membrane bioreactor treatment using a tank-submerged filtration membrane, and UF-treated water was prepared by subjecting seawater to an UF membrane treatment. The values of the total dissolved solids (TDS) [%] indicating the quality of the treated water are shown in Table 1. The two types of treated water were mixed at a weight ratio of 5:5 and retained in a water tank, and at the same time, the mixed water was irradiated with 30 mJ/m$^2$ of ultraviolet light having a wavelength of 254 nm using a low-pressure mercury lamp. At this time, the turbidity of the mixed water was 0.1 NTU. The ultraviolet-treated water was allowed to continue to pass through a RO membrane ("SWC5" manufactured by Nitto Denko Corporation). At the eighth week, the transmembrane pressure difference reached a serviceability limit (a value that is twice the initial value $\Delta P$ of the transmembrane pressure difference). The results are shown in Table 1.

Example 2

Tests were carried out in the same manner as in Example 1, except that domestic wastewater and seawater whose qualities were different from the qualities of the domestic wastewater and seawater in Example 1 were used. The results are shown in Table 1.

Comparative Example 1

Tests were carried out in the same manner as in Example 1, except that the same seawater as used in Example 1 and the same domestic wastewater as used in Example 2 were used, and the ultraviolet treatment was not performed. The results are shown in Table 1.

Comparative Example 2

Tests were carried out in the same manner as in Example 1, except that the same treated water as used in Example 2 were used, and the ultraviolet treatment was not performed. The results are shown in Table 1.

Comparative Example 3

Tests were carried out in the same manner as in Example 1, except that the same UF-treated water as used in Example 1 was used alone, and MBR-treated water was not mixed in. The results are shown in Table 1.

Comparative Example 4

Tests were carried out in the same manner as in Example 1, except that the same MBR-treated water as used in Example 1 was used alone, and UF-treated water was not mixed in. The results are shown in Table 1.

The deterioration of the RO membrane was smaller in Example 1 and Example 2 than in Comparative Example 1, Comparative Example 2, and Comparative Example 4. In Comparative Example 3, the deterioration of the RO membrane was small. However, since MBR-treated water was not mixed in and a large amount of the UF-treated water having a high salt concentration was treated alone, the pressure of the pump for feeding the water to the RO membrane was increased. Consequently, the desalination energy in Comparative Example 3 was more than twice the desalination energy in Example 1.

TABLE 1

| | Example 1 | Example 2 | Comparative Example 1 | Comparative Example 2 | Comparative Example 3 | Comparative Example 4 |
|---|---|---|---|---|---|---|
| Quality of UF-treated water (TDB) [%] | 4.4 | 3.6 | 4.4 | 3.6 | 4.4 | — |
| Quality of MBR-treated water | 0.05 | 0.03 | 0.03 | 0.03 | — | 0.04 |

TABLE 1-continued

| | Example 1 | Example 2 | Comparative Example 1 | Comparative Example 2 | Comparative Example 3 | Comparative Example 4 |
|---|---|---|---|---|---|---|
| (TDS) [%] Mixing ratio (UF-treated water:MBR-treated water) | 5:5 | 5:5 | 5:5 | 5:5 | 10:0 | 0:10 |
| UV treatment | Performed | Performed | Not performed | Not performed | Performed | Performed |
| Average value of desalination energy [kWh/m³] | 1.5 | — | — | — | 3.3 | — |
| Time taken for pressure difference to reach serviceability limit [weeks] | 8 | 8 | 4 | 4 | 8 | 6 |

DESCRIPTION OF REFERENCE NUMERALS

1 Organic wastewater
2 Seawater
3 Filtration membrane for membrane bioreactor treatment
4 Ultrafiltration membrane module
5 Mixed water tank
6 Ultraviolet irradiation treatment apparatus
7 Booster pump
8 Reverse osmosis membrane module
9 Membrane bioreactor treatment apparatus

The invention claimed is:

1. A seawater desalination method for obtaining freshwater from seawater by a reverse osmosis membrane treatment, the method comprising the steps of:
   obtaining ultrafiltration membrane-treated water by subjecting seawater to an ultrafiltration membrane treatment;
   obtaining membrane bioreactor-treated water by subjecting organic wastewater to a membrane bioreactor treatment;
   obtaining mixed water by mixing the ultrafiltration membrane-treated water and the membrane bioreactor-treated water;
   obtaining ultraviolet irradiation-treated water by subjecting the mixed water to an ultraviolet irradiation treatment; and
   subjecting the ultraviolet irradiation-treated water to a reverse osmosis membrane treatment.

2. The seawater desalination method according to claim 1, wherein the ultraviolet irradiation treatment is performed with 10 to 140 mJ/cm² of ultraviolet light.

3. The seawater desalination method according to claim 1, wherein the ultraviolet irradiation treatment is performed with ultraviolet light having a wavelength of 250 to 260 nm.

4. The seawater desalination method according to claim 1, wherein the mixed water has a turbidity of 0.001 to 0.5 NTU.

* * * * *